(12) United States Patent
Anderson

(10) Patent No.: US 8,607,004 B2
(45) Date of Patent: Dec. 10, 2013

(54) DISTRIBUTED SYMMETRIC MULTIPROCESSING COMPUTING ARCHITECTURE

(76) Inventor: Richard S. Anderson, Boston, MA (US)

( * ) Notice: Subject to any disclaimer, the term of this patent is extended or adjusted under 35 U.S.C. 154(b) by 442 days.

(21) Appl. No.: 12/946,626

(22) Filed: Nov. 15, 2010

(65) Prior Publication Data

US 2011/0125974 A1 May 26, 2011

Related U.S. Application Data

(60) Provisional application No. 61/261,281, filed on Nov. 13, 2009.

(51) Int. Cl.
*G06F 12/02* (2006.01)
(52) U.S. Cl.
USPC ............. 711/153; 711/E12.005; 709/203
(58) Field of Classification Search
None
See application file for complete search history.

(56) References Cited

U.S. PATENT DOCUMENTS

| | | | |
|---|---|---|---|
| 5,297,265 A | 3/1994 | Frank et al. | |
| 5,341,483 A | 8/1994 | Frank et al. | |
| 5,561,784 A | 10/1996 | Chen et al. | |
| 5,592,625 A | 1/1997 | Sandberg | |
| 5,950,228 A | 9/1999 | Scales et al. | |
| 6,026,474 A * | 2/2000 | Carter et al. | 711/202 |
| 6,148,377 A | 11/2000 | Carter et al. | |
| 6,266,745 B1 | 7/2001 | de Backer et al. | |
| 6,336,170 B1 | 1/2002 | Dean et al. | |
| 6,829,637 B2 | 12/2004 | Kokku et al. | |
| 6,862,608 B2 | 3/2005 | Buhlman et al. | |
| 6,944,719 B2 | 9/2005 | Rowlands et al. | |
| 6,990,516 B2 | 1/2006 | Chen | |
| 7,680,987 B1 * | 3/2010 | Clark et al. | 711/147 |
| 2002/0073071 A1 | 6/2002 | Pong et al. | |
| 2003/0018737 A1 | 1/2003 | Buhlman et al. | |
| 2003/0023702 A1 | 1/2003 | Kokku et al. | |
| 2003/0041225 A1 | 2/2003 | Mattina et al. | |
| 2005/0125556 A1 | 6/2005 | Curran et al. | |
| 2007/0260821 A1 | 11/2007 | Zeffer et al. | |
| 2009/0144388 A1 | 6/2009 | Gross et al. | |
| 2009/0150511 A1 | 6/2009 | Gross et al. | |

OTHER PUBLICATIONS

International Search Report and Written Opinion, PCT/US2010/056717, mailing date Jul. 7, 2011.
International Preliminary Report on Patentability from PCT/US2010/056717, dated May 15, 2012.

* cited by examiner

*Primary Examiner* — Denise Tran
(74) *Attorney, Agent, or Firm* — Hamilton, Brook, Smith & Reynolds, P.C.

(57) ABSTRACT

Example embodiments of the present invention includes systems and methods for implementing a scalable symmetric multiprocessing (shared memory) computer architecture using a network of homogeneous multi-core servers. The level of processor and memory performance achieved is suitable for running applications that currently require cache coherent shared memory mainframes and supercomputers. The architecture combines new operating system extensions with a high-speed network that supports remote direct memory access to achieve an effective global distributed shared memory. A distributed thread model allows a process running in a head node to fork threads in other (worker) nodes that run in the same global address space. Thread synchronization is supported by a distributed mutex implementation. A transactional memory model allows a multi-threaded program to maintain global memory page consistency across the distributed architecture. A distributed file access implementation supports non-contentious file I/O for threads. These and other functions provide a symmetric multiprocessing programming model consistent with standards such as Portable Operating System Interface for Unix (POSIX).

15 Claims, 4 Drawing Sheets

DISTRIBUTED SYMMETRIC MULTIPROCESSING COMPUTING ARCHITECTURE

RELATED APPLICATION

This application claims the benefit of U.S. Provisional Application No. 61/261,281, filed on Nov. 13, 2009. The entire teachings of the above application are incorporated herein by reference.

BACKGROUND OF THE INVENTION

Current supercomputer architectures include networks of compute nodes (also referred to herein as servers) that implement a parallel processing programming model using dozens to tens of thousands of processors. Each individual compute node has one or more processors, and is connected to the network using Ethernet, InfiniBand®, or other high-speed communication link. There are two distinct architectures used for these machines. The first is distributed or non-shared memory. In this case, each compute node has its own private memory that cannot be accessed by any other node. Coordination between nodes is achieved by sending messages between them using a programming model called message passing interface (MPI). This approach has the advantage of being scalable and able to use commodity hardware. The disadvantage is the difficulty of constructing programs for this model and the inefficiency incurred from the overhead of message passing.

The alternate approach is known as shared memory or symmetric multiprocessing (SMP). In this model, there is a single global memory shared by all processors. The advantage of this approach is that the programming model is simpler than MPI, and is applicable to a much larger range of problems. The disadvantage is the difficulty and cost of implementing a shared memory architecture. The high cost is due in large part to the fact that all shared memory machines have been built with proprietary components, including custom backplanes and communication links. In addition, these machines have limited scalability. The high cost and lack of scalability has limited the deployment of shared memory supercomputers in recent years. This has remained an open problem in the field.

The currently available shared memory supercomputers are implemented using a hardware cache coherent architecture. In this approach each compute node contains proprietary hardware that monitors memory access by every processor in the machine on a cache line (64 or 128 byte) basis. A technique known as memory snoops is required of every memory access to check to see if another processor is using the same line of memory. Coordination of access, including exclusive write locks, is all handled in hardware. As the number of processors increases, the snoop activity increases dramatically, placing a practical limit on scaling of about 500 processors.

An alternate approach to hardware cache coherent shared memory was suggested in the late 1980's based on the concept of shared virtual memory. In this approach all compute nodes share a common global memory that is divided into pages. Each node can access memory pages from the global memory using demand paging software. When needed, a page can be locked for exclusive access by a single node. The approach is implemented entirely in software, usually in the operating system, and does not require memory snoops or specialized hardware. The backing storage for the shared virtual memory may be disk or physical memory. If physical memory is used, pages may exist on any of the nodes or on an attached memory appliance. Memory coherency is maintained on a page basis instead of a cache line basis. This is referred to as page coherency. Coordination of exclusive page access or even page assignment is usually handled by a central service, but may also be distributed. The most promising aspect of this approach is that it is theoretically highly scalable.

During the early 1990's, several attempts were made to build experimental or commercial supercomputers based on shared virtual memory, also known as distributed shared memory (DSM). One major company attempted to build a commercial mainframe using DSM but abandoned this approach in favor of cache coherent architectures due to inadequate performance. Another company built a commercial supercomputer that supported DSM, but both the product and company folded, again due to lack of performance and high cost. Several academic and research institutions built experimental supercomputers supporting DSM.

In spite of these efforts, a commercially viable DSM mainframe or supercomputer was never achieved. The reason for this is two-fold. First, none of these machines reached performance levels that were competitive with cache coherent designs. Second, all of these machines used expensive proprietary processors and communication components. An example is the company who produced a supercomputer according to the aforementioned DSM design, which used proprietary processors connected together in a proprietary communications architecture employing a two level hierarchy of rings. This design was at least as expensive as the hardware cache coherent designs, but lacked their performance.

In the mid 2000's, another design approach was introduced by other companies. Borrowing from the technology used in virtualization, a virtual machine that mimics a cache coherent SMP machine is created from a network of servers. In this approach the operating system is not modified. Instead, an additional software layer, called a hypervisor, is placed between the operating system and the underlying hardware. This software creates a virtual machine However the performance is poor, making the approach inadequate for use in supercomputing applications.

As a result of these failures, and the continued high cost of cache coherent machines and their limited scalability, the supercomputing community has shifted away from shared memory machines This has had a negative impact on research and innovation by limiting the number of software codes that can be run on supercomputers. Thus, there remains a need for cost effective, scalable SMP machines with acceptable performance.

SUMMARY OF THE INVENTION

An embodiment of the present invention provides a scalable symmetric multiprocessing (SMP) supercomputer and methods of building a scalable symmetric multiprocessing (shared memory) supercomputer using a tightly coupled cluster of homogeneous multi-core servers. As understood by those skilled in the art, an SMP supercomputer is a supercomputer whose processors share a global memory. SMP supercomputers support an application program model that allows multiple execution threads to run in the same address space, utilizing multiple processors.

Each server (node) in the network is itself a symmetric multiprocessing (SMP) computer that includes two or more processors. A high-speed InfiniBand®, Ethernet, fiber optic, or other network that supports remote direct memory access (RDMA) transfers connects the nodes. One of the nodes in the network is configured as the head node and provides the user interface. The other nodes are configured as worker nodes and do not provide a user interface. Together, all of the nodes combine to form a single SMP computer with a number of processors equal to the sum of the processors in each node, and the total shared memory equal to at least two-thirds of the sum of the memory in each node. Example SMP supercomputers can be implemented using industry standard (commodity) hardware and do not require custom components. The level of processor and memory performance achieved is suitable for running applications that currently require far more expensive SMP mainframes and supercomputers built with proprietary technologies. Furthermore example SMP supercomputers can be scaled to support a SMP implementation of thousands of processors.

Embodiments take advantage of recent advancements in high-speed network communication technology in order to achieve a distributed shared memory (DSM) across all the compute nodes in the network. A new type of distributed shared memory that uses a transactional model is implemented. In this transactional distributed shared memory (T-DSM), the physical memory in each node is divided into two partitions: a local working memory and a global shared memory. The global partitions on each node are combined to form a single global shared memory that is linearly addressable by all nodes in a consistent manner. The global memory maintains a reference copy of each memory page used by any program running on the system, at a fixed address. The local memory contains a subset of the total memory pages used by the running program. Memory pages are copied from global memory to local memory, when needed by the executing program. Any changes made to local memory pages are written back to the global memory. Memory consistency between a page in global memory and all copies of the page in local memory, is maintained by providing the application program interface (API) with a set of operations that allow a global memory page to be locked for exclusive access, to release the lock, and to force a local memory page to be immediately updated to global memory. This allows a program with multiple execution threads, possibly running on multiple nodes, to maintain global memory page consistency across all nodes. The memory page lock operations used are similar to those used in database transactions.

Embodiments of the invention include a distributed thread model which allows a program running in the head node to create an execution thread running in a worker node. The thread shares the same logical address space of the program, but executes in the local physical memory of the node on which it is created. Memory pages are copied from global memory to local memory to meet the needs of the executing thread. Also included is a distributed mutual exclusion lock (mutex) implementation that supports the synchronization of two or more threads executing on different nodes.

Embodiments of the invention address two important performance problems experienced by multi-threaded shared memory programs. The first problem is false sharing, where two independent variables are placed on the same memory page. The locking of one variable will always force the locking of the other variable, which may degrade performance. The problem is alleviated by providing the programmer with an aligned memory allocation function that forces the allocation to start on a new memory page. This gives the programmer an ability to separate independent variables when required.

The second problem is the delay in execution that occurs when multiple execution threads must synchronize their access to a common resource. The primary example of this occurs when multiple execution threads attempt to write data to or read data from a file on a disk. In this case, a mutex is used to synchronize access to the file input/output operations, requiring threads to stop execution while waiting for their turn. This can significantly slow the progress of the program. The problem is alleviated by providing distributed input/output message queues, which allow a thread running on any node to send or receive a logically complete message to a resource manager program running on the head node. For the case of file access, a disk input/output resource manager program runs on the head node, and provides a distributed output queue that any thread running on any node can use for writing logically complete output records to a file on a disk. The queue is large enough to hold enough messages so that a thread can write its output asynchronously and continue executing without the need to wait for access to the disk resource or wait for the completion of the write operation. In addition, a distributed input queue is provided that allows any thread to post a read request from a file on a disk. This solution provides a means for threads running on worker nodes to read or write data from the file system.

Together the transactional distributed shared memory and the other aforementioned elements can be used to implement a symmetric multiprocessing (SMP) computing environment that supports the Portable Operating System Interface (POSIX) threads standard, and other shared memory multi-threading programming models.

The following table contains a glossary of basic computer science terms used in this application.

| Term | Definition |
| --- | --- |
| address space | A linear addressable sequence of one byte memory locations that represent instructions or data. If the addresses are physical memory locations in computer hardware, it is a physical address space. If they are addresses used by a computer program it is a logical (or virtual) address space. |
| application (computer) program | A computer program is a set of instructions that execute on a computer and perform one or more specified tasks. An application program performs a task for a user of the computer. An operating system program performs a task that is required to make the computer function as a computer. |
| broadcast | The sending of a message to all of the nodes (servers) in a network or cluster. |
| cluster | A set of computers connected together. Each computer in the cluster is often referred to as a node. |

-continued

| Term | Definition |
|---|---|
| communication port | A point of connection on a computer or other device that allows transmission and/or reception of data. |
| communication switch | A device supporting data transmission among a set of two or more computing devices. |
| disk | A device that provides persistent storage of data on a computer, including after the computer is turned off. |
| distributed shared memory | A configuration for a computer system cluster where there exists a memory region that physically resides on two or more nodes in the cluster, and is accessible by all nodes in the cluster. |
| execution thread (thread) | The execution of the instructions of a program by a single processor. Multiple execution threads can exist simultaneously in a running program. |
| false sharing of independent variables | A situation in a running program where two variables cannot be locked and/or accessed independently from each other. |
| file | A named sequential block of data stored on a disk. |
| fork | A procedure in which a process (see definition) creates a copy of itself causing a new execution thread. The new thread may share the address space of its parent process or it may create a separate duplicate address space. |
| head node | The node of a multi-node computer system that provides a user interface and starts the execution of application programs. |
| latency | The time required for a function or task to complete. |
| memory | A linearly addressed sequence of locations in a computer, each capable of storing a single (8 bit) character or number called a byte, in a manner that a computer processor may use and act on that location. An executing computer program has both its instructions and data stored in memory. |
| memory consistency (memory coherency) | A protocol that guarantees that each copy of a memory region with an identical address, in a multimode computer system has the same content. If the size of the memory region is a cache line (64 bytes), it is called cache coherent. If the size of the region is a memory page (4096) it is called page coherent. |
| memory page | A fixed size unit of organization of memory. Usually 4096 locations (bytes). |
| multi-core processor | A device which contains two or more processors on the same silicon chip. Each processor is referred to as a core. |
| mutex (mutual exclusion lock) | A mechanism that protects a shared resource by allowing only one thread or other entity to access it at a time. |
| operating system | The master program in a computer. It provides the environment needed to run application programs and is implemented as a software layer between the computer hardware and application programs. |
| page fault | An event that occurs when a processor attempts to access a memory page that is not physically present in memory. This causes an interruption of execution that is handled by special computer instructions (code). |
| page table | A mapping in the computer memory that translates logical (virtual) addresses to physical addresses. |
| process | A running computer program and the environment associated with it, including the execution instruction code, memory, and input/output files. |
| processor (Central Processing Unit) | A computing device that executes a computer program inside the memory of the computer. |
| queue | A list of data ordered by first in first out (FIFO). |
| RDMA (remote direct memory access) | A computer hardware mechanism whereby data can be moved directly between the physical memory of a computer or device to the physical memory of a computer without the help of the processor on the computer. |
| symmetric multiprocessing | A computer system that includes multiple processors that share a global memory. |
| user interface | An environment provided to the user of a computer that allow for the execution of programs and the entry and recovery of data. |
| virtual memory | A memory organization used in modern computers where the logical addresses contained in computer programs are translated to physical addresses in memory. |
| worker node | A node in a cluster that supports the head node but does not provide a separate user interface. |

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF THE INVENTION

A description of example embodiments of the invention follows.

Embodiments of the distributed symmetric multiprocessing (DSMP) presented herein include at least five unique and practical features: (1) the use of a cluster of symmetric multiprocessing (SMP) nodes to create a large SMP system; (2) the use of high-speed communication links supporting remote direct memory access (RDMA) to decrease latency in memory page access; (3) the use of a two-tiered memory including a local working memory and a global shared memory construct; (4) the use of transactional memory model to maintain memory consistency with page coherency; and (5) the use of distributed queues to create distributed disk file access within a cluster.

Apparatus for Implementing a Distributed Symmetric Multiprocessing System

Figure 1:
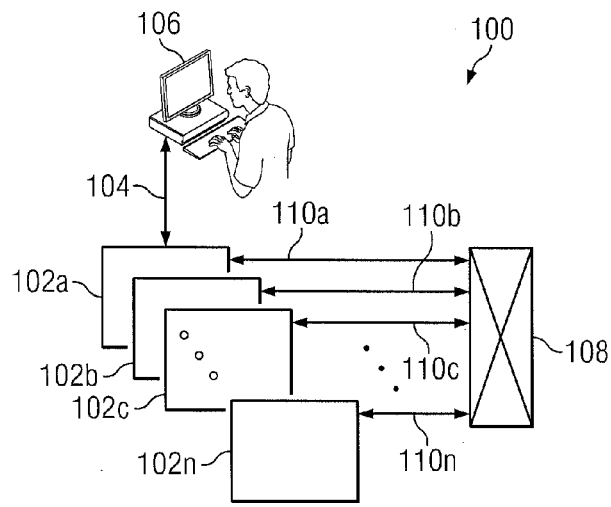
FIG. 1 is a block diagram of a switched DSMP computing-system.

The emergence of multi-core processors and high-speed RDMA communication links has presented the software community with powerful new tools. DSMP provides a means of fully utilizing these advances. FIG. 1 shows an SMP computing-device within a DSMP computing system 100 that is an autonomous computing-device with processors, memory, and network port(s). There may also be disk storage and input/output interfaces. Elements 102a, 102b, 102c, . . . 102n (collectively, servers 102) represent individual SMP servers. Attached to server 102a is a local connection interface 104 which allows user 106 to communicate with the DSMP computing-system 100. A switch 108 connects together the servers 102 via respective via network interfaces 110a, 110b, 110c, . . . 110n (collectively, network interfaces 110). The upper limit on the number of computing-devices (servers 102) that comprise the computing system 100 depends on the capacity of the switch 108. That limit is a function of the availability of a switch 108 which can support a single-hop connection. This configuration represents a switched DSMP implementation.

Figure 2:
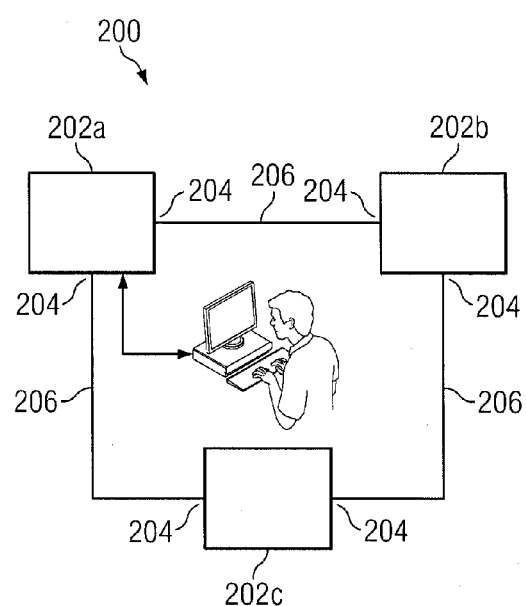
FIG. 2 is a block diagram of a direct-connect DSMP computing-system.

FIG. 2 shows an SMP computing-system 200 that includes three computing-devices (SMP servers) 202a, 202b, and 202c (collectively, servers 202). Each server 202 is an autonomous SMP computing device with processors, memory, input/output interfaces and at least two network ports 204. The network ports 204 of the primary server 202a are connected directly to servers 202b and 202c via high-speed (e.g., 40 GB/s or higher) communications links 206, such as Infini-Band® switched fabric communications links, to form a three-way mesh. This configuration represents direct connect DSMP implementation.

Figure 3:
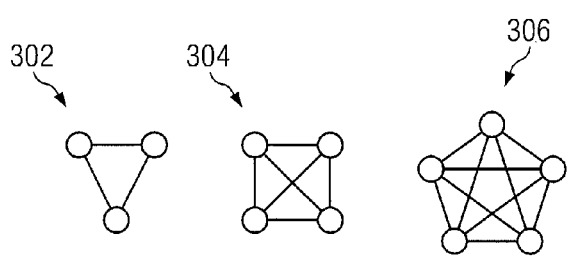
FIG. 3 is a block diagram of additional direct-connect DSMP computing-system options.

FIG. 3 shows three architectures 302, 304, and 306 for SMP computer-systems including several computing-devices (SMP servers), the number of which is a function of available network ports on the computing-devices. The computing-system in FIG. 2 with two network ports is shown in simplified form in FIG. 3 as example 302. Hence, a computing-device with "n" available network ports (via conductive cable, optical link or RF link) can implement a computing-system of the size "n+1". Again, referring to FIG. 3, shown are three examples: 302 with two (n=2) network ports forming a three (n+1=3) computing-device computing-system; 304 with three (n=3) network ports forming a four (n+1=4) computing-device computing-system; and 306 with four (n=4) network ports forming a five (n+1=5) computing-device computing-system and so on.

Referring again to FIGS. 1 and 2, the network interfaces 110 each interface to a host channel adapter on a respective server 102 that supports Remote Direct Memory Access (RDMA). This is accomplished with optimized low-level drivers that bypass the legacy drivers. Directly invoking the RDMA logic in the hardware to move data between computing-devices eliminates the need of going from memory space to message space and back again, minimizing the overhead for message construction and deconstruction. In addition, it permits one-sided operations where the initiating node need not explicitly interrupt the target node.

Figure 6:
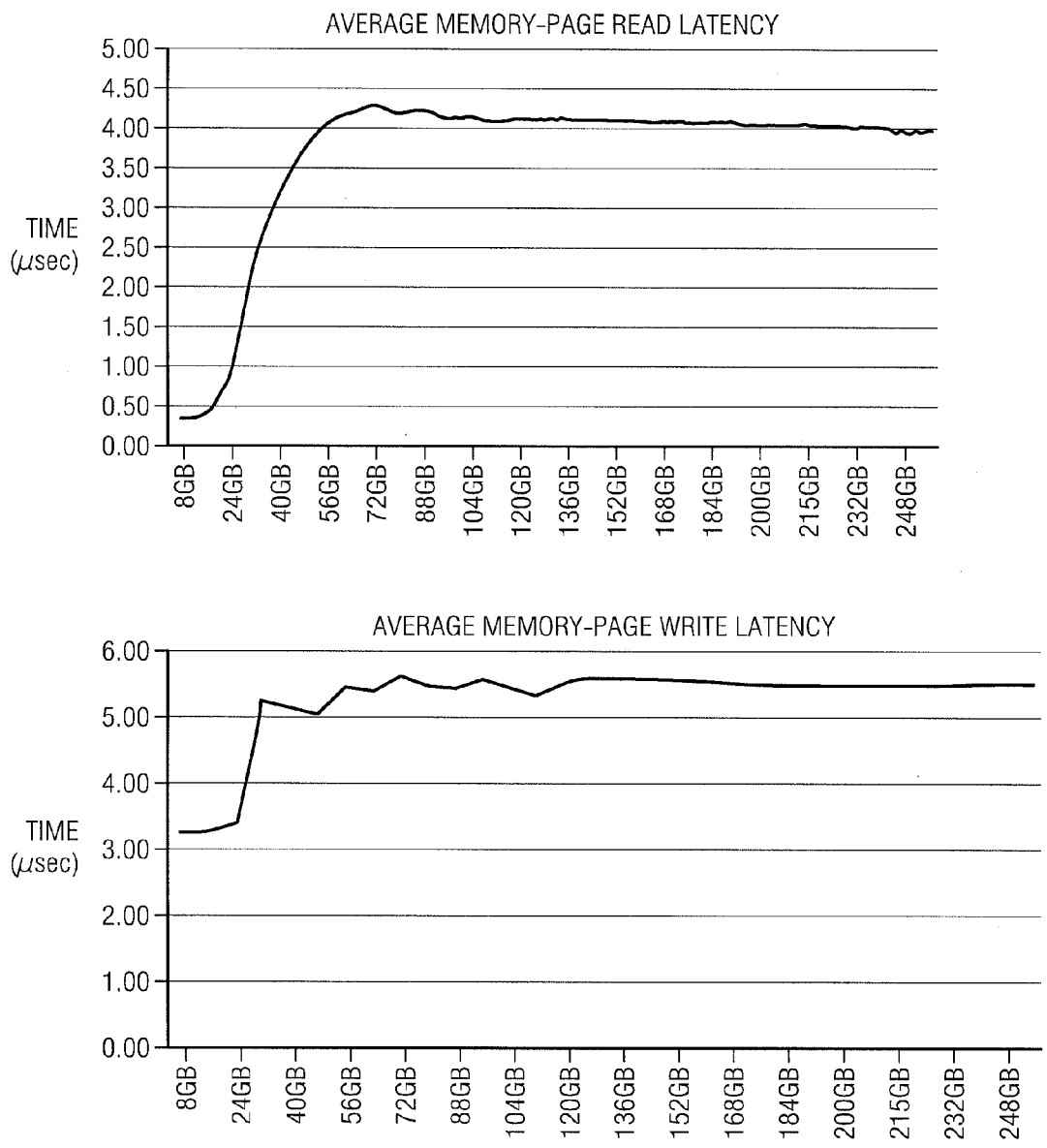
FIG. 6 is a plot of random read and write latency for 4K byte memory-page access.

FIG. 6 includes two graphs that show that the RDMA technique described above provides a level of performance previously unseen. On average, it takes less than 5 μs to randomly read in a memory page of 4,096 bytes and less than 6 μs to write. This level of random R/W performance makes DSMP unique and commercially viable. As a point of reference, hardware cache coherent shared-memory supercomputers take on the order of 1 μs to read one 64- or 128-byte cache-line and memory appliances take 3 μs. Approaches that use hypervisors or other added software layers require in excess of 40 μs.

Embodiments of the invention include systems and methods for the implementation of a symmetric multiprocessing (SMP) computing system that is created from an underlying collection of homogeneous SMP servers that are connected together in a tightly coupled network or cluster using a high-speed communications link that supports remote direct memory access (RDMA). The system integrates this computer hardware architecture with new and existing operating system techniques to create a new derived work which I call a distributed symmetric multiprocessing (DSMP) system. The system comprises the following parts: a plurality of homogeneous symmetric multiprocessing servers; a high-speed network supporting RDMA operations; Unix like operating system(s); transactional distributed shared memory (T-DSM); distributed thread management; distributed mutex management; a method for handling false sharing of variables in a DSM; and a distributed message based disk I/O queues.

Implementing a Distributed Shared Memory

Alternative embodiments include a method for the implementation of a distributed shared memory that exists globally on an underlying network of servers and supports memory page coherency using a transactional model. The control of memory page locking and synchronization is passed to the programmer via a new set of operating system primitives.

The memory is divided into a single global shared region and a plurality of local working regions (one per node). The physical memory on each node of the system is divided into a local and a global partition. The global partitions on each node are concatenated together to form a single global shared memory. All memory is addressable on a page basis. The global memory contains the ultimate reference copy of every memory page used by an executing application program.

All memory pages in global memory use fixed logical addressing, which translates to a physical page address on a particular node in the system. This is important in that it eliminates the need to search for global memory pages, and it allows for the use of one-sided RDMA operations in moving pages between global and local memory.

Figure 4:
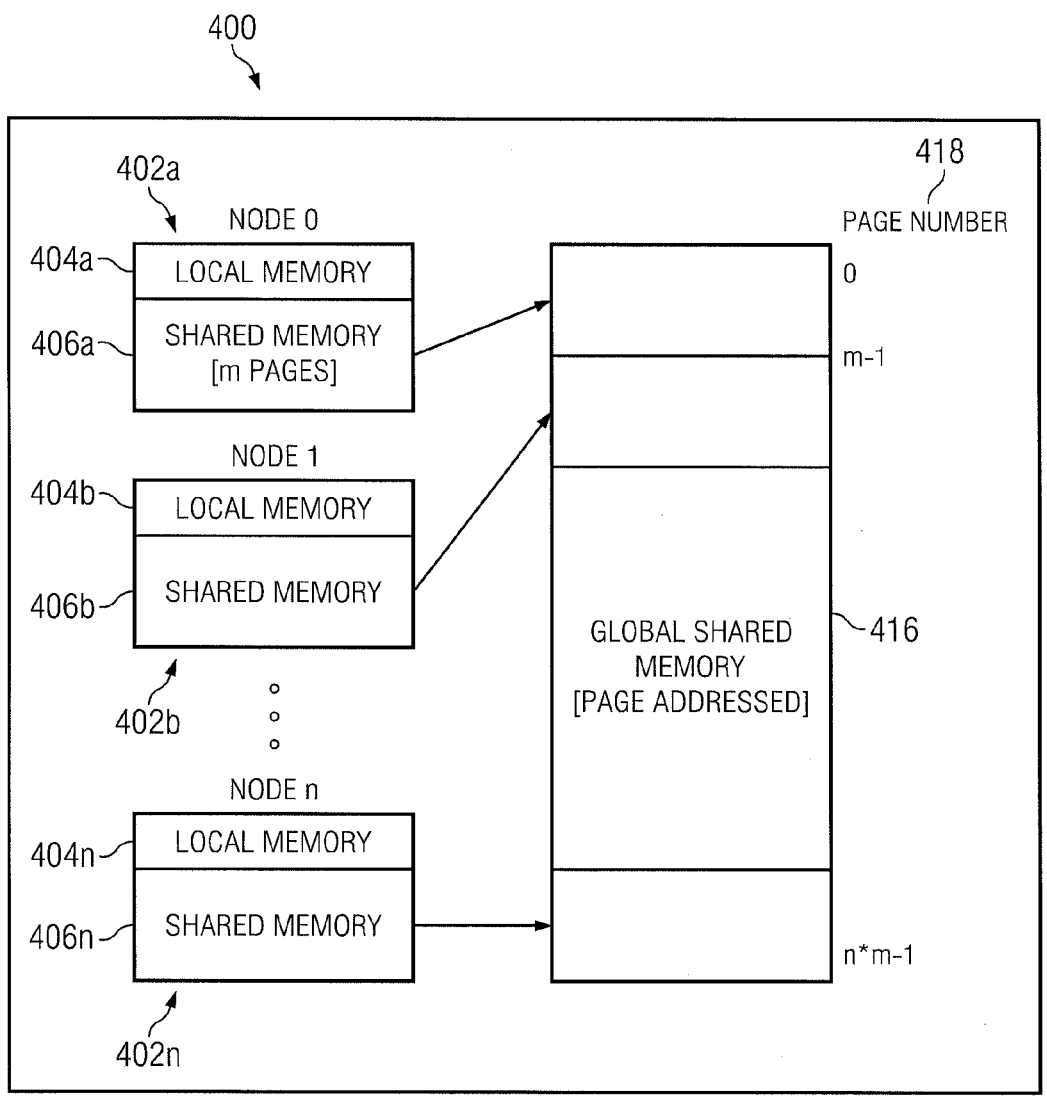
FIG. 4 is a block diagram illustrating organization of local and global memory within a DSMP system.

All application program threads execute in the local memory of a node, but see a memory space that is a subset of the full global memory. Memory pages are copied from global to local memory as required by the program. Modified local memory pages are copied from local to global memory in order to maintain a consistent global memory representation. An application program can force the immediate availability of a modified page to global memory by issuing a memory page synchronization request using an operating system primitive FIG. 4 shows a DSMP computing system with SMP servers (nodes) 402a, 402b, . . . 402n whose memories form a T-DSM. As shown in FIG. 4, the physical memory in each computing device (node or server) 402 that forms a DSMP system is divided into two sections: a local working memory 404 and a global shared memory portion 406. The local memory 404 supports all operating system and application software running a multi-core processor associated with the respective local node 402. The global memory sections 406 from the nodes 402 are joined together to create a single large distributed global memory 416. This global memory 416 is addressed on a page level (e.g., 4096 bytes) using fixed logical addressing 418 that is consistent for all nodes 402. From the point of view of the nodes 402, the global memory 416 serves as a backing store for virtual memory Importantly, the size of virtual memory cannot exceed that of global memory 416, and every virtual memory page must actually exist in global memory 416. Thus a distributed virtual memory is implemented, with paging between the local memory of a node and the global distributed shared memory. The size of the local-memory is fixed at boot time. In practice, a minimal local memory 404 of 1 GB per processor-core is recommended.

Referring again to FIG. 4, the actual organization of memory within a node 402 may vary depending upon whether or not there is a single memory controller or multiple controllers. For example, in a node 402 with four processors (i.e., a multicore processor), where each processor physically has memory attached to it, there are four physical memory regions within the node 402. It is advantageous to divide each of these regions into a local region 404 and global region 406. The local regions 404 are logically combined and the global regions 406 are logically combined to produce the representation shown in FIG. 4.

The two-tiered memory, with global and local memory, used by the transactional DSM approach was avoided in earlier attempts at implementing DSM. Memory was much more expensive at that time, and the idea of wasting it in this way was unthinkable to computer architects. More critical was the fact that the time spent copying pages between global and local memory needed to be minimized. A two-tiered memory requires more page copying in order to keep the global memory updated. However it eliminates the need to have to search the network of nodes for a memory page. The dramatic change in the speed of communication links has meant that it is less time consuming to copy a page than it is to search for a page in a very large memory space.

Implementing Transactional Memory Page Locks

Embodiments also include method for the implementation of memory page transaction locks. An application program thread can lock one or more memory pages for exclusive access using an operating system primitive. The lock request is handled by the node which owns the global copy of the targeted memory page. If the lock is granted, that node broadcasts a message to all other nodes invalidating and locking the page. When the lock is released, a broadcast is sent to all nodes unlocking the page.

The use of transactional memory moves the responsibility of maintaining memory consistency away from the machine and operating system, to the programmer. The programmer already has the responsibility of synchronization of threads that access shared resources including data structure in memory. Adding the responsibility of knowing when memory pages must be locked or updated to global memory should not be a great burden. More importantly, the operating system has no way of determining when to execute these operations without knowing the true intent of the programmer. The only alternative the operating system has is to lock memory pages on all vulnerable operations, which will dramatically decrease performance. To aid the programmer in achieving and maintaining system wide memory coherency, three transactional memory primitives are provided: Sync, Lock, and Release. The Sync primitive forces an immediate update of a local memory page to global memory. The Lock and Release support exclusive access to a global memory page.

Implementing Distributed Thread Management

Embodiments also include method for the implementation of distributed thread management on an underlying network of SMP servers that support distributed shared memory. The method reproduces the SMP program execution model across multiple servers. All application programs are started in the head server node. The program may then fork additional execution threads that run in the same node, or in a worker node. If a thread is forked to a worker node, the memory environment of the program is duplicated in the worker node, by copying page tables, etc. A thread is then launched on the worker node and memory pages are copied from global memory as needed to support execution of the thread. The head node maintains a global thread table of threads executing on remote nodes.

Figure 5:
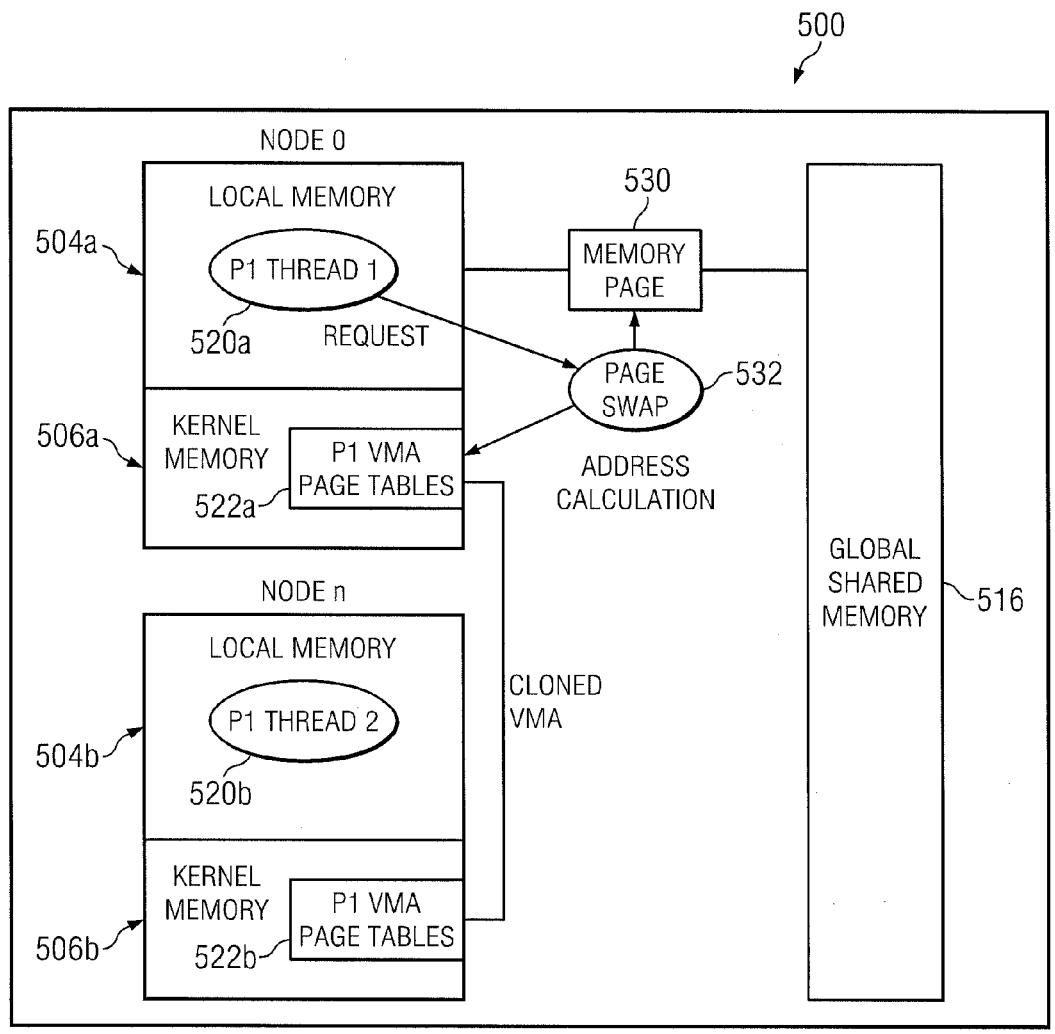
FIG. 5 is a block diagram illustrating thread creation on worker nodes.

FIG. 5 shows a SMP computing system 500 that includes two SMP servers 502a, which acts as a head node, and 502b, which acts as a worker node. Each server includes a local memory 504a, 504b and a global memory portion 506a, 506b, which are concatenated with other global memory portions 506a, 506b to form a global shared memory 516 that store reference copies of memory pages for access by the multi-core processors associated with the servers 502a, 502b.

As shown in FIG. 5, the implementation of distributed threads, with threads forked by a process running in the head node 502a on to worker nodes 502b, takes advantage of the two-tiered memory used by DSMP. Since all of virtual memory is actually contained in the global shared memory 516, a thread created on a worker node 502b can address the identical address space of the parent thread on the head node 502a provided that page tables 522a and 522b in the nodes 502a and 502b are identical. In FIG. 5, a parent thread 520a in SMP server 502a (the head node) forks a thread in a remote node 502b by first cloning its virtual memory area (VMA) and page tables 522a and 522b, then creating a thread 520b in the remote node 502b that points to the cloned VMA. In the head node 502a, a distributed thread table keeps track of remote threads.

Implementing Distributed Mutex Management

Yet another embodiment is a method for the implementation of distributed mutex management on an underlying network of SMP servers. Synchronization between threads on different nodes is accomplished by extending the mutual exclusion lock (mutex) function to operated globally across all the nodes in the system. This is accomplished by adding a distributed mutex table to each node. Whenever a mutex is created on the head node, a corresponding mutex is created on every worker node. The distributed mutex table handles the mapping between a global distributed mutex and its local version. All locks or waits on a mutex are first filtered through the global distributed mutex table to handle those cases where the mutex is remotely addressed.

Implementing Distributed Disk I/O

Still another embodiment includes a method for the implementation of distributed disk I/O on an underlying network of SMP servers. In most high performance computing problems, a major bottleneck exists around input/output devices. When a write is invoked, the entire process can be stalled due to write requests to slow input/output devices such as a hard-disk drives. To address this bottleneck, a new distributed queue mechanism is provided that allows messages up to a memory page in length to be sent between nodes. All direct disk access is assumed to occur from the head node. The method is designed to extend disk access to threads running in worker nodes. In addition, the method provides non-contentious access to disk writes that do not require waiting on a mutex. The method uses a message queue in the head node that accepts messages that are the size of a memory page. This allows writes of a logical data record to a file that are up to 4K bytes, for example. This is used to post output records from threads running in any node on the system to an input/output (I/O) server on the head node. Using this mechanism, a replacement buffered I/O interface is provided to programs.

Handling False Sharing of Independent Variables

Embodiments further include a method for handling false sharing of independent variables in a distributed shared memory environment. This is accomplished by extending the operating system memory allocation to include a primitive that forces the requested allocation to begin on a new memory page boundary. Using this feature, the programmer can separate independent variables when needed.

EMBODIMENTS OF INVENTION

While this invention has been particularly shown and described with references to example embodiments thereof, it will be understood by those skilled in the art that various changes in form and details may be made therein without departing from the scope of the invention encompassed by the appended claims.

Embodiments of the invention or portions thereof implemented in the form of hardware, firmware, or software. If implemented in software, the software may be any language capable of performing embodiments as discussed herein. The software may be stored as machine executable instructions on any form of machine readable medium, such as RAM, ROM, CD-ROM, loaded by a processor, and executed by the processor.

What is claimed is:

1. A method of performing symmetric multiprocessing (SMP) computing, the method comprising:

forming a cluster of SMP compute nodes (servers), with the memory in each node similarly divided into a local and global partition, where the global partitions of each node combine together to form a single global memory;

starting and executing an application program in the local memory partition of the head SMP node in the cluster;

allowing additional threads of the program to be launched and executed by processor cores in the head node or in worker nodes;

identify and copy a given memory page from the global memory to the local memory partition of a given SMP node when needed by the executing program thread; and enabling a thread to lock for exclusive access a given memory page in the global memory.

2. The method of claim 1 wherein identifying and copying the given memory page occurs with a latency of less than 4 microseconds.

3. The method of claim 1 wherein identifying and copying the given memory page includes transmitting data between a given pair of SMP nodes in the cluster via a directly coupled communications link between the given pair of SMP nodes.

4. The method of claim 1 wherein identifying and copying the given memory page includes transmitting data between a given pair of SMP nodes in the cluster via a switch.

5. The method of claim 1 further including:

maintaining a fixed logical address in the global memory for a given memory page, wherein the fixed logical address:

(a) translates to a physical page address in the global memory partition of a particular SMP node in the cluster;

(b) eliminates any need to search for memory pages in the global memory; and (c) enables use of one-sided remote direct memory access operations in moving the given memory page between the local memory and the global memory.

6. The method of claim 1 further including:

copying a modified memory page from the local memory partition to global memory to maintain a consistent representation of an application program logical address space.

7. The method of claim 1 wherein enabling a program thread to lock a given global memory page for exclusive access by the thread, by issuing a lock request via an operating system primitive, and further including:

handling the lock request with the SMP node whose global memory partition stores a reference copy of the given memory page.

8. The method of claim 7 further including:

broadcasting a message invalidating and locking the targeted memory page from the SMP node whose global memory partition hosts the reference copy of the targeted memory page, to other SMP nodes in the cluster if the lock request is granted.

9. The method of claim 7 further including:

broadcasting a message to SMP nodes in the cluster unlocking the given memory page when the lock is released.

10. The method of claim 1, further including:
allowing a thread to force immediate availability of a modified memory page to global memory by using a memory page synchronization operating system primitive.

11. The method of claim 1, wherein enabling the programmer to avoid false sharing of independent variables by placing these variables on different memory pages using an aligned allocation operating system primitive that forces a new memory block to begin on a new memory page.

12. The method of claim 1, wherein distributed thread management is implemented on a network of symmetric multiprocessing (SMP) nodes that support distributed shared memory, the method comprising:
reproducing an SMP program execution model across multiple nodes;
starting all application programs on a head node;
launching additional execution threads that run in the head node or in a worker node; and
maintaining a global thread table of threads executing on worker nodes in the head node.

13. A method as in claim 12 further including:
duplicating the process environment of an application program running on the head, including page tables, on to a worker node, to allow the launching and execution of threads on the work node.

14. A method as in claim 12 further including:
launching a thread on the worker node from the head node; and
receiving a notification when execution of the thread is complete.

15. A method of claim 1, wherein distributed mutual exclusion lock (mutex) management is implemented on an underlying network of symmetric multiprocessing servers, the method comprising:
maintaining a global mutex table configured to track remote mutex activity at each node; and
filtering all locks or waits on a mutex through the global mutex table to handle those cases where the mutex is remotely addressed.

* * * * *